United States Patent [19]

Smith

[11] Patent Number: 5,163,865
[45] Date of Patent: Nov. 17, 1992

[54] METHOD AND APPARATUS FOR PROCESSING FISH FILLETS AND OTHER FOOD ITEMS INTO PREDETERMINED PORTIONS

[75] Inventor: Larry J. Smith, Sitka, Ak.

[73] Assignee: Innerspace Technologies of Alaska, Inc., Sitka, Ak.

[21] Appl. No.: 697,089

[22] Filed: May 8, 1991

[51] Int. Cl.⁵ .............................................. A22C 25/18
[52] U.S. Cl. ..................................... 452/157; 83/365; 83/371
[58] Field of Search ........................ 452/157, 158, 161; 83/208, 209, 286, 289, 288, 370, 371, 861, 168

[56] References Cited

U.S. PATENT DOCUMENTS

| | | | |
|---|---|---|---|
| 2,768,666 | 10/1956 | Garapolo et al. | 83/364 |
| 3,762,257 | 10/1973 | Mathews, Jr. | 83/364 |
| 4,084,294 | 4/1978 | Dohrendorf | 452/162 |
| 4,136,504 | 1/1979 | Wyslotsky | 83/365 |
| 4,484,375 | 11/1984 | Brower | 452/162 |
| 4,542,559 | 9/2485 | Brower | 452/162 |
| 4,557,019 | 12/1985 | Vandevanter | 452/157 |
| 4,586,409 | 5/1986 | Kuchler | 83/112 |
| 4,674,378 | 6/1987 | Kawano et al. | 83/365 |
| 4,726,094 | 2/1988 | Braeger | 452/157 |
| 4,737,904 | 4/1988 | Ominato | 83/371 |
| 4,748,724 | 6/1988 | Lapeyre et al. | 452/158 |
| 4,756,058 | 7/1988 | Gollnitz et al. | 452/156 |
| 4,868,951 | 9/1989 | Akesson et al. | 452/157 |
| 4,875,254 | 10/1989 | Rudy et al. | 452/157 |
| 4,899,422 | 2/1990 | King | 452/157 |

*Primary Examiner*—Willis Little
*Attorney, Agent, or Firm*—Pravel, Gambrell, Hewitt, Kimball & Krieger

[57] ABSTRACT

Disclosed is an apparatus and method for cutting or marking fish fillets and other foodstuffs of varying cross-section into portions of predetermined size by conveying each product through a volume scanning unit, computing correct cut locations, and then cutting or marking at each location using a guillotine-type knife mechanism. The guillotine-type knife mechanism moves in a longitudinal direction while cutting perpendicular to the conveyor surface. Dislocation of the fillet is eliminated by synchronizing knife speed with the conveyor, and by overcoming resistance of blade retraction with a retraction mechanism.

20 Claims, 5 Drawing Sheets

METHOD AND APPARATUS FOR PROCESSING FISH FILLETS AND OTHER FOOD ITEMS INTO PREDETERMINED PORTIONS

BACKGROUND OF THE INVENTION

1. Field of the Invention

The invention relates to a method and apparatus for processing food. In another aspect, this invention relates to a method and apparatus for the automated cutting of foodstuffs into portions of predetermined sizes. In still another aspect, this invention relates to a method and apparatus for the automated cutting of fish fillets, chicken, meat or other foodstuffs of irregular cross-section into portions of predetermined sizes.

2. Description of the Related Art

In the production of packaged frozen foods such as meat, chicken or fish products, it is important that the weight of the portions be controlled as accurately as possible, otherwise the weights will vary at the time of the filling of the packages resulting in certain disadvantages. For example, underweight portions of incorrect weight have to be rejected leading to significant losses of fish or meat material while overweight portions have to be adjusted to the correct weight, which increases the cost of processing and packaging.

Fish, chicken and meat portions of uniform weight are also desired by restaurants to ensure that customers receive servings which are neither too slight nor too generous. For example, a restaurant may prefer to serve its patrons 6 ounce or 8 ounce portions of fish and will pay more for fish portions which are within a given tolerance of the desired weight.

When whole fish is commercially processed, the fish is typically sent to a filleting machine which cuts the fish along the backbone to produce two elongated portions or "fillets." The fillets are further divided into portions of predetermined size by making cuts transverse to their long axis, such cuts being spaced at distances which depend on the cross-section of the fillet.

Prior art methods for estimating and cutting such fillet portions to a predetermined size include both manual and automatic methods.

Manual methods of cutting fillet portions generally consist of manually estimating the portion of a fish fillet necessary to provide the desired weight, and then manually cutting the fillet. The cut fillet portions are then weighed to determine if they were within the tolerance desired for a particular use. Manual estimating and cutting suffers from being relatively slow and labor-intensive, and even the most skilled laborer cannot always produce accurate portions.

U.S. Pat. No. 4,557,019, issued Dec. 10, 1985, to Van Devanter et al. and U.S. Pat. No. 4,875,254, issued Oct. 24, 1989, to Rudy et al. both disclose apparatus for automatically portioning fish fillets, in which fillets are applied to a conveyor belt, passed through an electronic image scanning system, then cut into a plurality of portions by a cutting mechanism. The electronic image scanning system detects and scans the shape of the fillet, computes the weight of the fillet, and then activates the cutting mechanism to make the desired cuts.

The Van Devanter et al. cutting mechanism is a rotary saw which is passed across the fillet in a direction slightly skewed from transverse to prevent the saw blade from displacing the fillet longitudinally while cutting. However, the high mass and lengthy travel of the rotary saw limits repetition rate of cuts or requires large and expensive drive and support components to achieve adequate repetition rate. Thus while the apparatus may be suitable for limited commercial production, without an adequate repetition rate, it is not possible to integrate the Van Devanter et al. apparatus into an automatic filleting line. It is also well known that the apparatus does not ensure a complete division or separation of the fillet portions reliably because it is difficult to operate the saw such that it cuts through the fillet without also cutting the conveyor belt. Furthermore, the transverse motion of the saw tends to displace the fillet from the position in which it was measured on the conveyor, upsetting precision of subsequent cuts. Finally, the saw kerf can remove a significant amount of flesh which is wasted.

Rudy et al. utilizes as the cutting mechanism a high pressure water-knife system. Unfortunately, the water-knife system is very expensive and generates a high level of audible noise which is disruptive in a production environment.

Since both prior art systems utilize a projected light pattern and electronic camera to measure fillet volume, they are subject to problems created by spurious reflections of light due to specularity such as that created when the conveyor belt is wet.

Therefore a need exists in the art for an apparatus and method for automatically portioning fish, chicken, meats and other foodstuffs into portions of predetermined size, without the prior art deficiencies.

SUMMARY OF THE INVENTION

According to one embodiment of this invention there is provided an apparatus for cutting a fillet of irregular cross-section into a plurality of reduced size portions comprising: a frame; a conveyor comprising an endless loop belt and adapted to travel in the longitudinal direction; means for measuring the fillet as it moves on the conveyor to determine longitudinal position and transverse angle for each of a plurality of desired cuts; and at least one guillotine-type cutting means comprising a guillotine blade, said means for cutting along the line of action as determined above, located above the conveyor, moveable in a direction longitudinal to the conveyor.

According to another embodiment of this invention there is provided a process for cutting a fillet of irregular cross-section into a plurality of reduced size portions comprising: conveying the fillet in a linear path; measuring the fillet as it moves on the conveyor to determine longitudinal position and transverse angle for each of a plurality of desired cuts; and cutting the fillet with a guillotine-type cutting mechanism as determined above.

According to yet another embodiment of this invention there is provided a process for marking a fillet of irregular cross-section into a plurality of reduced size portions comprising: conveying the fillet in a linear path; measuring the fillet as it moves on the conveyor to determine longitudinal position and transverse angle for each of a plurality of desired cuts; and cutting the fillet with a guillotine-type cutting mechanism as determined above.

BRIEF DESCRIPTION OF THE DRAWINGS

In order to more fully explain the drawings used in the detailed description of the present invention, a brief description of each drawing is presented.

DETAILED DESCRIPTION OF THE INVENTION

Wherever mentioned herein, the term "fillet" should be taken to include any fish, chicken, meat or other foodstuffs of irregular cross-section to be cut into predetermined sizes.

Figure 1:
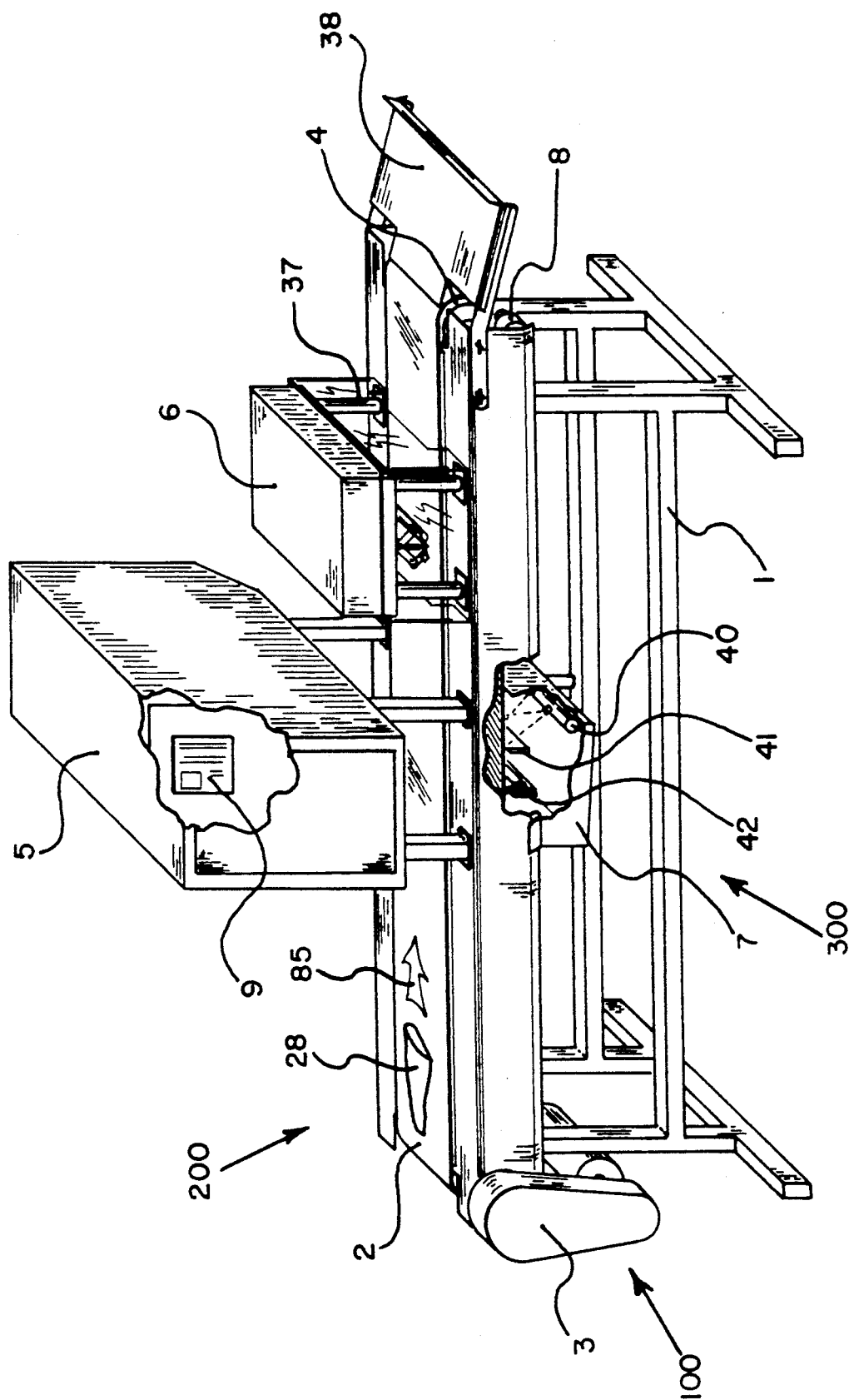
FIG. 1 is a isometric view of the apparatus of the present invention for processing foodstuffs to predetermined portions.

FIG. 1 shows an isometric view of the preferred embodiment of the apparatus of the present invention. It can be seen that the apparatus of the present invention generally comprises a series of stations, each disposed along, above or proximate to a conveyor system. The apparatus of the present invention comprises frame 1, a feeding system (not shown) located generally at feed area 200, a conveyor system 100, volume measuring unit 5, and cutting mechanism 6.

Conveyor system 100 is a conventional conveyor system that conveys fillet 28 in a linear path represented by direction arrow 85. Conveyor system 100 comprises endless loop, elongated conveyor belt 2 with a smooth, non-specular finish, conveyor drive 3, and takeup roller 4.

The feeding system is required to place the foodstuffs to be processed on conveyor belt 2 at feed area 200 and may be a manual system or it may be any of the feeding systems well known in the art. The apparatus of the present invention may also be fed from the discharge end of any commercial filleting system such as for example that disclosed in U.S. Pat. No. 4,542,559, issued Sep. 24, 1985 to Brower.

Volume measuring unit 5 determines the volume of the fillet 28 and further determines the longitudinal position for each of a plurality of perpendicular transverse cuts to be made. Volume measuring unit 5 is typically a camera that inputs an image into a computer or processor unit for the determination of volume. Suitable volume measuring units include those disclosed in U.S. Pat. Nos. 4,557,019 and 4,875,254, both herein incorporated by reference. Commercially available volume measuring units include video camera Model No. TM240T from Pulnix America, Inc. for use with a wide variety of computer systems, and a processing unit and camera system, the Opcon IS-10 "Inspector Series", available from Opcon Company of Everett, Wash.

Cutting mechanism 6 is a guillotine-type cutting mechanism.

Endless loop, elongated conveyor belt 2 is supported by support frame 1, and driven at a constant speed by conveyor drive 3 in a direction shown by direction arrow 85. The conveyor belt 2 travels sequentially through volume measuring unit 5, through guillotine-type cutting mechanism 6, around conveyor takeup roller 4, through a belt cleaning mechanism 7, before returning to the location of conveyor drive 3.

In operation, fillet 28 is placed on the conveyor belt 2 at feed area 200, near the conveyor drive 3 and carried under the volume measuring unit 5. The volume measuring unit 5 determines the volume of the fillet 28 and further determines the longitudinal position for each of a plurality of perpendicular transverse cuts to be made. Volume measuring unit 5 receives pulses from rotary encoder 8 to synchronize measurements with the conveyor belt 2, and issues a signal to cutting controller 9 at the proper times to cut each portion.

Figure 2:
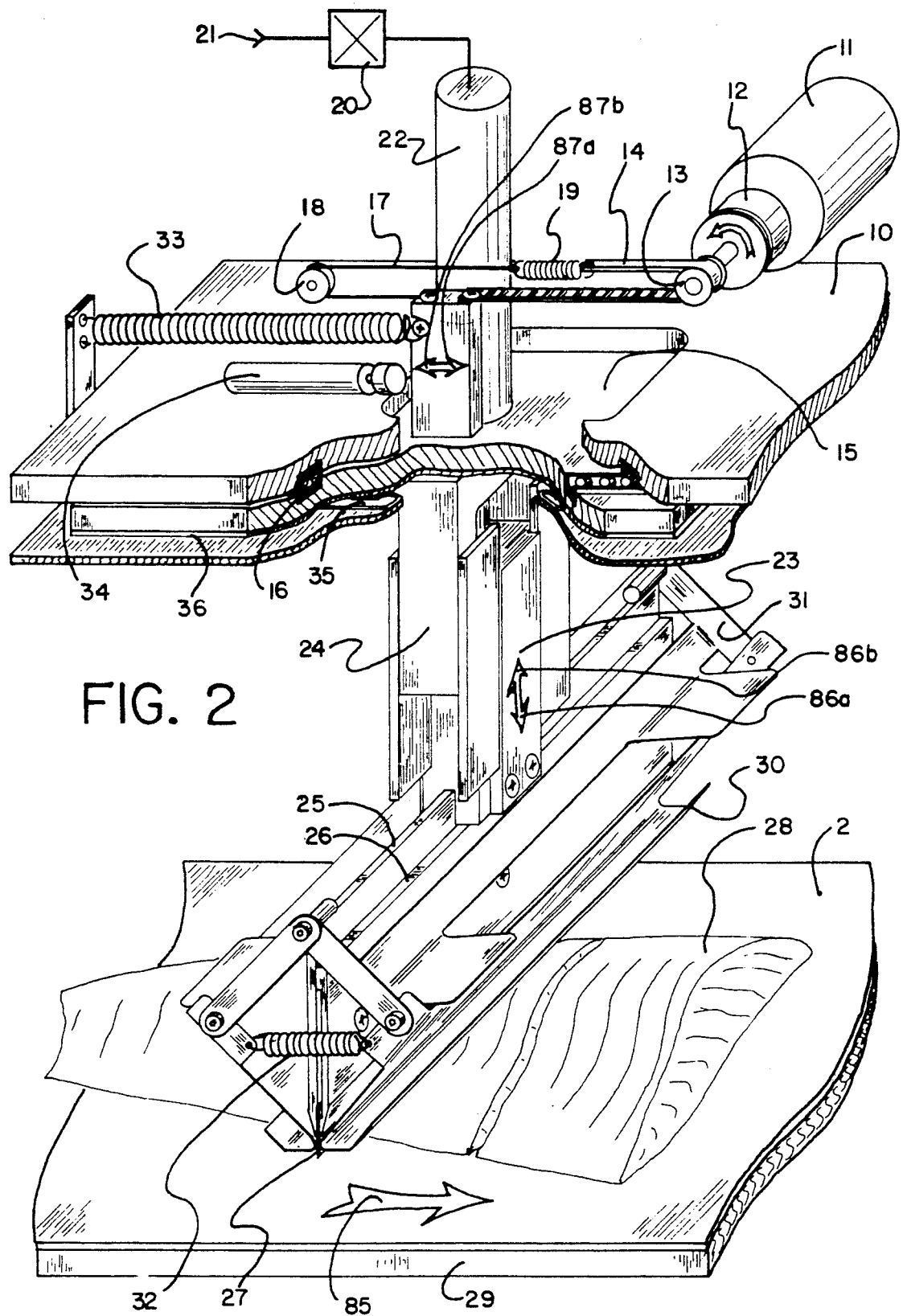
FIG. 2 is an isometric view of the guillotine-type cutting mechanism of the present invention illustrated in FIG. 1.
Figure 3A:
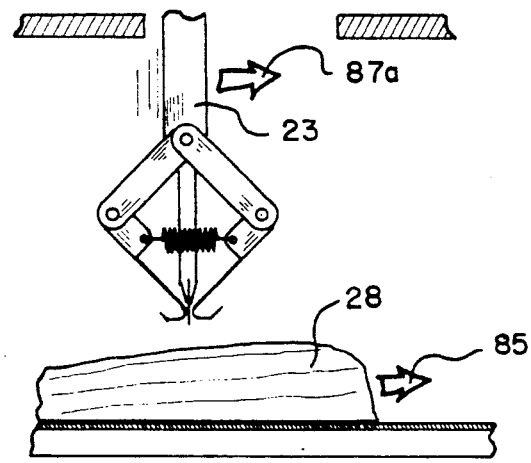
FIGS. 3(A-D) are digrams illustrating the sequence of cutting motions performed by the cutting mechanism of the present invention.
Figure 3B:
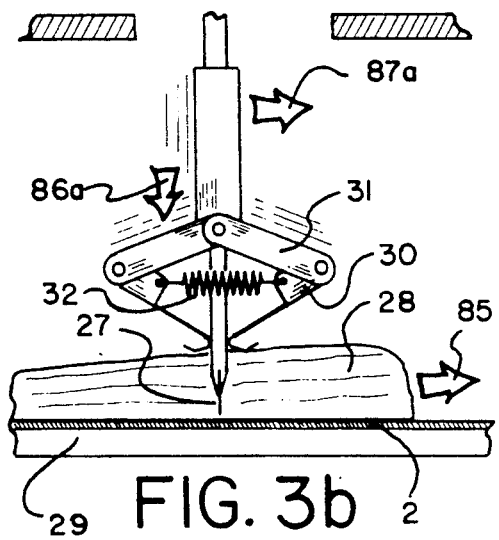
Figure 3C:
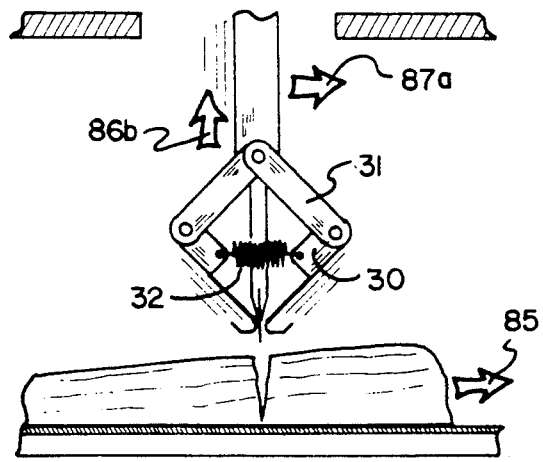
Figure 3D:
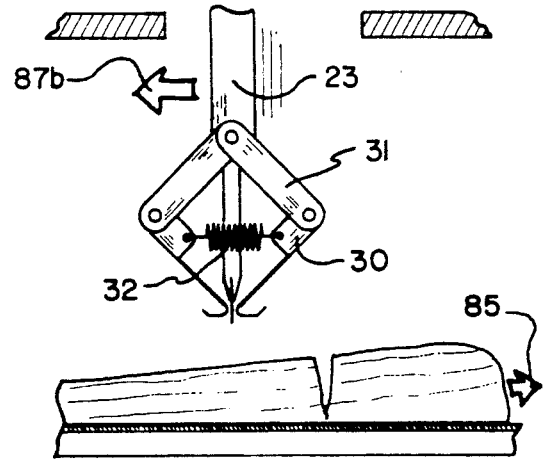

Referring additionally to FIG. 2, which shows an enlarged view of cutting mechanism 6, it can be seen that stepping motor 11 is supported in a fixed location by chassis plate 10 and rotates at a substantially constant speed proportional to the speed of the conveyor belt 2. Signals from the rotary encoder 8 are received by the cutting controller 9 which then drives stepping motor 11. As fillet 28 advances under cutting mechanism 6 to the point at which a cut is required, cutting controller 9 issues an electrical current to operate clutch 12 which converts rotation of stepper motor 11 through sprocket 13 and timing belt 14 into translation 87 (87a is shown to the right, and 87b is shown to the left) of carriage plate 15. Timing belt 14 is held taut by tensioning cable 17 which passes around idle pulley 18 and tensioned by belt tensioning spring 19. Carriage plate 15 is secured to chassis plate 10 using roller ways 16 which constrain carriage plate 15 to a single degree of freedom, being translation 87 in a direction longitudinal to the conveyor belt 2.

A predetermined time after clutch 12 is engaged, and carriage plate 15 has reached a speed exactly matching the conveyor belt 2, the cutting controller 9 issues an electrical current to operate solenoid valve 20 which allows compressed air from air supply 21 to actuate pneumatic cylinder 22 which is supported by carriage plate 15.

The shaft of pneumatic cylinder 22 pushes plunger 23 along plunger guide frame 24 downward in a direction 86a perpendicular to the plane of conveyor belt 2. Plunger 23 is attached firmly to fixed knife jaw 25 which joins with removable knife jaw 26 to retain razor blade 27. The sharp edge of razor blade 27, aligned in a direction transverse to the conveyor belt 2, is forced through fillet 28 in a downward direction perpendicular to the plane of conveyor belt 2 until it nearly touches conveyor belt 2 which is supported rigidly by belt support 29.

After a predetermined cutting time sufficient to complete the cutting motion, cutting controller 9 removes electrical current from solenoid valve 20 which reverses the cylinder 22, pulling razor blade 27 upward in direction 86b from fillet 28.

After a predetermined retraction time, sufficient to retract blade 27 to the full upward position, controller 9 removes electrical current from clutch 12, releasing carriage plate 15 which is pulled back to rest position by carriage return spring 33 into shock absorber 34, ready to begin a new cut cycle.

Referring now to FIGS. 3A-D it can be seen that as blade 27 is forced downward in direction 86a into fillet 28 that is moving in direction 85, retractor blade wiper 30 is stopped upon meeting the surface of fillet 28, swiveling retractor hinge plate 31 which is fixed to top of fixed knife jaw 25 (FIG. 2), and stretching retractor spring 32. As blade 27 is withdrawn upward in direction 86b, retractor blade wiper 30 remains in contact with surface of fillet 28 until razor blade 27 has fully emerged, preventing suction along sides of razor blade 27 from lifting fillet 28 up from conveyor belt 2. Since while cutting, blade 27 is moving at same longitudinal speed in direction 87a as conveyor belt 2 is moving in direction 85, and since fillet 28 is held securely by retractor blade wiper 30 while blade 27 is being retracted, the position of fillet 28 relative to the conveyor 2 is not substantially disturbed, ensuring that subsequent cuts on the same fillet 28 as the blade 27 is moved to a new position in direction 87b are not substantially adversely affected.

Razor blade 27 is low in cost and is typically replaced and discarded when cutting efficiency becomes diminished.

Weather strip 35 (FIG. 2) forms a water-tight contact with glide sheet 36 to keep water out of upper section of cutting mechanism. In the embodiment shown, weather strip 35 is comprised of Teflon but may be comprised of any other suitable material, and glide sheet 36 is comprised of polyethylene and may also be comprised of any other suitable material.

Adjustable leg 37 (FIG. 1) can be changed in height to set the gap between razor blade 27 when extended and conveyor belt 2. A large gap may be set if it is desired only to mark fillet 28 rather than substantially sever fillet 28.

After leaving guillotine-type cutting mechanism 6 (FIG. 1), divided fillet 28 is ready for further processing, and may be further conveyed to another station, such as a packaging station (not shown). In the embodiment shown (FIG. 1), divided fillet 28 is removed from conveyor belt 2, by catch shelf 38 where it is taken away at leisure by the operator.

Figure 4:
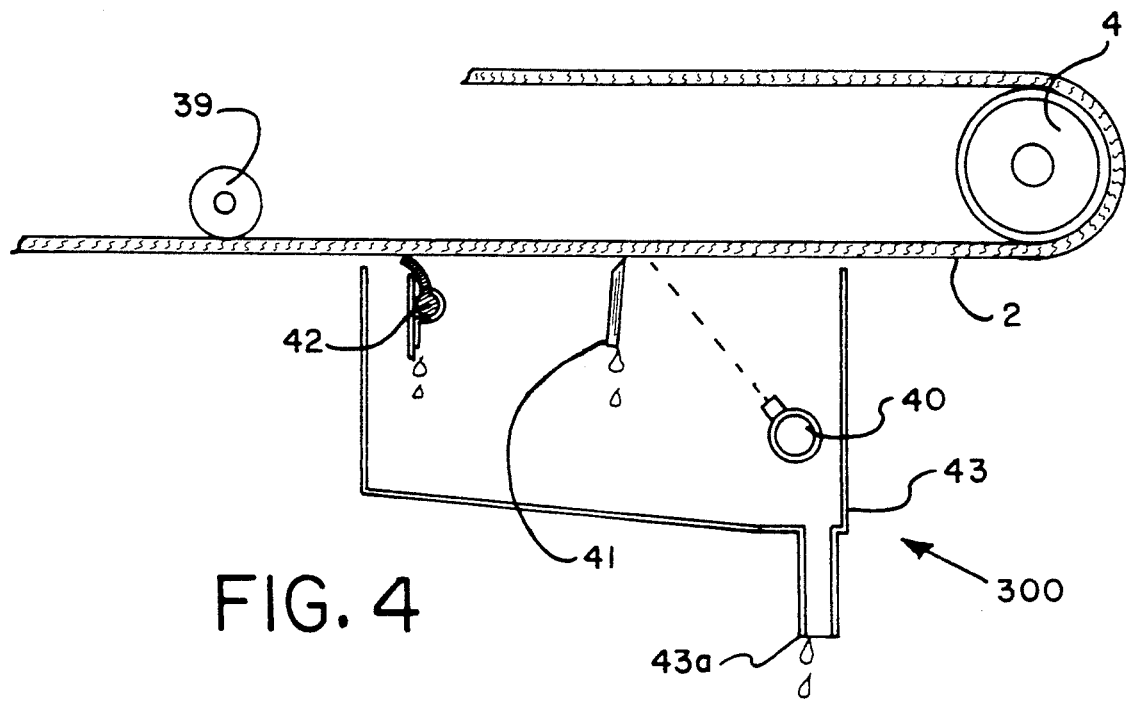
FIG. 4 is a cross-sectional view of the belt cleaning mechanism of the present invention illustrated in FIG. 1.

Referring now to FIG. 4, it can be seen that conveyor belt 2 proceeds around conveyor takeup roller 4 to belt cleaning mechanism, shown generally at 300, and is held taut by roller 39.

Belt cleaning mechanism 300 generally comprises belt sprayer 40, scraper 41, squeegee 42, and drain pan 43. Belt sprayer 40 delivers a spray of pressurized cleaning liquid to the surface of belt 2, loosening accumulated scales, flesh or slime. Scraper 41 removes loosened matter which is carried away by runoff from liquid spray. Squeegee 42 removes excess liquid from belt 2, resulting in a clean, dry belt surface to be presented for new fillets 28, preventing spurious reflections of light from disturbing measurements of volume measuring unit 5. Drain pan 43 gathers liquid spray caused by the action of belt sprayer 40, and liquid and loosened matter caused by squeegee 42, all of which exit out of drain 43a to be discarded.

A plurality of fillets may be situated on the conveyor simultaneously limited only by the need to separate individual fillets a minimum distance so that they may be distinguished by volume measuring unit 5.

Figure 5:
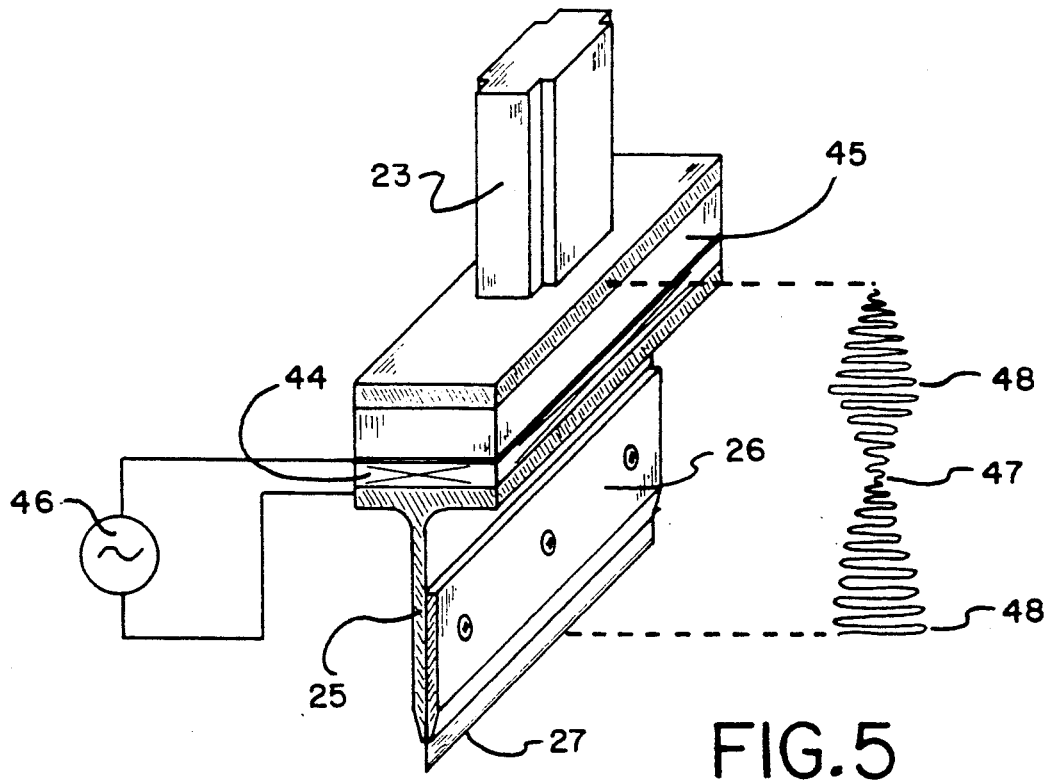
FIG. 5 is an isometric view of an optional embodiment of the cutting knife of the present invention illustrated in FIG. 2 which utilizes ultrasonic assist.

Optionally, an improved embodiment of guillotine-type cutting mechanism 6 uses an ultrasonically assisted knife as illustrated in FIG. 5. In this optional embodiment, plunger 23 and fixed knife jaw 25 are separated by piezoelectric crystal 44 and resilient cushion 45. Excited by appropriate voltage and frequency from sinusoidal electrical source 46, piezoelectric crystal 44 undergoes mechanical strain at a like frequency, imparting vibrations into the assembly comprising resilient cushion 45, fixed knife jaw 25, removable knife jaw 26 and razor blade 27. Frequency of electrical source 46 is chosen such that assembly vibrates in a mode of resonance, producing a standing wave across the assembly having displacement nodes 47 and peaks 48 occurring such that one displacement peak aligns with edge of razor blade 27. The ensuing rapid motion of the edge of razor blade 27 imparts energy into the cutting process, enhancing the knife effectiveness particularly in durable materials such as frozen fish flesh.

Figure 6:
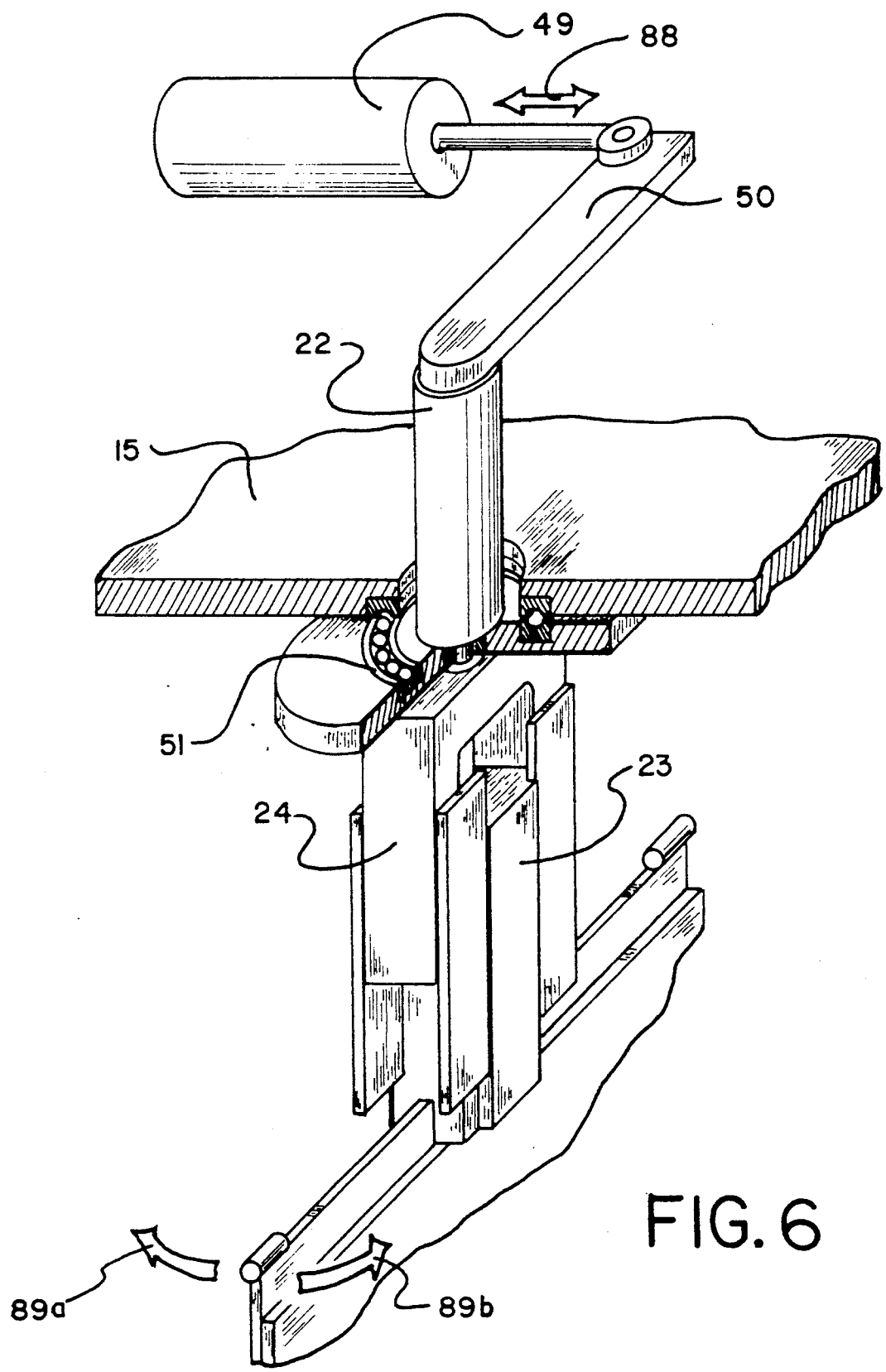
FIG. 6 is an isometric view of an optional embodiment of the plunger illustrated in FIG. 2 which allows for diagonal cuts.

Optionally, as illustrated in FIG. 6, an embodiment of the guillotine-type cutting mechanism 6 may be rotated about its axis of extension prior to cutting to achieve a cut at angles other than transverse to the conveyor belt. Such ability may be useful where diagonal cuts are required as with fish fillet portions where cuts are desired to be parallel to the head end or "collar" of the fillet which generally forms an acute angle relative to the back edge of the fillet. The preferred embodiment of this option comprises a linear actuator 49, actuating along a linear path 88, imparting torque through lever arm 50 and cylinder 22 to plunger 23 secured to carriage plate 15 via rotary thrust bearing 51 to rotate plunger 23 to a predetermined angular position in angular direction 89a or 89b.

The description given herein is intended to illustrate the preferred embodiments of the present invention. It is possible for one of ordinary skill in the art to make various changes to the details of the present invention, including changes in the size, shape and materials, as well as in the details of the illustrated construction without departing from the spirit of this invention. Therefore, it is intended that all such variations be included within the scope of the present invention as claimed.

I claim:

1. Apparatus for cutting a fillet of irregular cross-section into a plurality of reduced size portions comprising:
   a) a frame;
   b) conveyor comprising an endless loop belt and adapted to travel in the longitudinal direction;
   c) means for measuring the fillet as it moves on the conveyor to determine longitudinal position and transverse angle for each of a plurality of desired cuts;
   d) at least one guillotine blade, said cutting means for cutting as comprising a guillotine blade, said cutting means for cutting as determined from the longitudinal position and transverse angle of step (c), located above the conveyor, movable in a direction longitudinal to the conveyor, and
   e) means for keeping the cutting means positioned above the fillet and moving at the same longitudinal speed as the fillet during a cut.

2. The apparatus of claim 1 wherein the guillotine-type cutting mechanism includes means for actuating and retracting the guillotine blade without substantially disturbing the position of the fillet relative to the conveyor.

3. The apparatus of claim 1 wherein the guillotine-type cutting mechanisms includes means for imparting rapid periodic motion to the cutting edge of the guillotine blade.

4. The apparatus of claim 1 wherein the guillotine-type cutting mechanism includes means for rotating the guillotine blade about its lie of action to a predetermined angle.

5. The apparatus of claim 1 further comprising a cleaning means for continuously removing detritus and liquid from the surface of the conveyor belt, said cleaning means comprising a means for directing a cleaning liquid toward said belt, a means for scraping the belt to remove the detritus, and a means for squeegeeing the belt to squeegee off the liquid.

6. The apparatus of claim 1 wherein the fillet is not completely severed.

7. The apparatus of claim 1 wherein the fillet is a fish fillet.

8. A process for cutting a fillet of irregular cross-section into a plurality of reduced size portions comprising:
  a) conveying the fillet in a linear path;
  b) measuring the fillet as it moves on the conveyor to determine longitudinal position and transverse angle for each of a plurality of desired cuts; and
  c) cutting the fillet with a guillotine-type cutting mechanism as determined from the longitudinal position and transverse angle of step (b), wherein during cutting, the cutting mechanism travels at the same longitudinal speed as the fillet.

9. The process of claim 8 wherein wherein the guillotine-type cutting mechanism is actuated and retracted without substantially disturbing the position of the fillet relative to the conveyor.

10. The process of claim 8 wherein the guillotine-type cutting comprises rapid periodic motion of the cutting mechanism.

11. The process of claim 8 further comprising continuously removing detritus and liquid form the surface of the conveyor belt.

12. The process of claim 11 wherein the removing of the detritus and liquid comprising spraying a liquid toward the surface of the conveyor belt, scraping the belt to remove the detritus, and squeegeeing off the liquid from the belt.

13. The process of claim 8 wherein the fillet is a fish fillet.

14. The process of claim 8 wherein the fillet is not completely severed.

15. The process of claim 14 wherein wherein the guillotine-type cutting mechanism is actuated and retracted without substantially disturbing the position of the fillet relative to the conveyor.

16. The process of claim 14 wherein the guillotine-type cutting comprises rapid periodic motion of the cutting mechanism.

17. The process of claim 14 further comprising continuously removing detritus and liquid form the surface of the conveyor belt.

18. The process of claim 11 wherein the removing of the detritus and liquid comprises spraying a liquid toward the surface of the conveyor belt, scraping the belt to remove the detritus, and squeegeeing off the liquid from the belt.

19. The process of claim 14 wherein the fillet is a fish fillet.

20. Apparatus for cutting a fillet of irregular cross-section into a plurality of reduced size portions comprising:
  a) a frame;
  b) conveyor comprising an endless loop belt and adapted to travel in the longitudinal direction;
  c) means for measuring the fillet as it moves on the conveyor to determine longitudinal position and transverse angle for each of a plurality of desired cuts;
  d) at least one cutting means for cutting as determined from the longitudinal position and transverse angle of step (c);
  e) means for keeping the cutting means positioned above the fillet and moving a the same longitudinal speed as the fillet during a cut; and
  f) a cleaning means for continuously removing detritus and liquid from the surface of the conveyor belt, said cleaning means comprising a means for directing a cleaning fluid toward said belt, a means for scraping the belt to remove the detritus, and a means for squeegeeing the belt to squeegee off the liquid.

* * * * *